(12) United States Patent
Noh et al.

(10) Patent No.: US 11,017,733 B2
(45) Date of Patent: May 25, 2021

(54) ELECTRONIC DEVICE FOR COMPENSATING COLOR OF DISPLAY

(71) Applicant: SAMSUNG ELECTRONICS CO., LTD., Suwon-si (KR)

(72) Inventors: Donghoon Noh, Suwon-si (KR); Mingyu Kim, Suwon-si (KR); Jinyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/295,491

(22) Filed: Mar. 7, 2019

(65) Prior Publication Data
US 2019/0279580 A1     Sep. 12, 2019

(30) Foreign Application Priority Data
Mar. 7, 2018    (KR) ........................ 10-2018-0026746

(51) Int. Cl.
| | |
|---|---|
| *G09G 5/10* | (2006.01) |
| *G09G 5/00* | (2006.01) |
| *G06F 3/038* | (2013.01) |
| *G09G 3/34* | (2006.01) |
| *G06F 1/16* | (2006.01) |
| *G06F 3/041* | (2006.01) |

(Continued)

(52) U.S. Cl.
CPC ......... *G09G 3/3413* (2013.01); *G06F 1/1626* (2013.01); *G06F 1/1637* (2013.01); *G06F 1/1643* (2013.01); *G06F 3/0412* (2013.01); *G06F 3/0416* (2013.01); *G06K 9/00013* (2013.01); *G09G 3/2003* (2013.01); *G09G 3/32* (2013.01); *G09G 5/02* (2013.01); *G09G 2320/0242* (2013.01); *G09G 2320/0666* (2013.01); *G09G 2354/00* (2013.01); *G09G 2360/145* (2013.01)

(58) Field of Classification Search
None
See application file for complete search history.

(56) References Cited

U.S. PATENT DOCUMENTS

| | | |
|---|---|---|
| 7,502,038 B2 | 3/2009 | Yasuda et al. |
| 2007/0146266 A1 | 6/2007 | Yasuda et al. |

(Continued)

FOREIGN PATENT DOCUMENTS

| | | |
|---|---|---|
| EP | 3 226 174 | 10/2017 |
| KR | 10-2007-0076893 | 7/2007 |

(Continued)

OTHER PUBLICATIONS

International Search Report dated Jul. 5, 2019 in counterpart International Patent Application No. PCT/KR2019/002653.

(Continued)

*Primary Examiner* — Nan-Ying Yang
(74) *Attorney, Agent, or Firm* — Nixon & Vanderhye P.C.

(57) ABSTRACT

An electronic device includes a housing including a front plate and a back plate opposite the front plate, a touchscreen display exposed through a portion of the front plate and including an organic light emitting diode (OLED), a fingerprint sensor interposed between the display and the back plate and overlapping the display when viewed above the front plate, and a processor operatively connected with the display and the fingerprint sensor.

20 Claims, 9 Drawing Sheets

(51) Int. Cl.
*G06K 9/00* (2006.01)
*G09G 3/20* (2006.01)
G09G 5/02 (2006.01)
G09G 3/32 (2016.01)

(56) References Cited

U.S. PATENT DOCUMENTS

| | | |
|---|---|---|
| 2009/0184947 A1 | 7/2009 | Hupman et al. |
| 2015/0325177 A1 | 11/2015 | Takanashi |
| 2017/0212613 A1 | 7/2017 | Hwang et al. |
| 2017/0213491 A1 | 7/2017 | Seo et al. |
| 2017/0289805 A1* | 10/2017 | Hong |
| 2018/0005005 A1* | 1/2018 | He .................... G06F 21/83 |
| 2018/0218710 A1 | 8/2018 | Park et al. |
| 2019/0122023 A1* | 4/2019 | Chen ................ G06K 9/00013 |

FOREIGN PATENT DOCUMENTS

| | | |
|---|---|---|
| KR | 10-2017-0005756 | 1/2017 |
| KR | 10-2017-0087635 | 7/2017 |

OTHER PUBLICATIONS

Extended Search Report dated May 16, 2019 in counterpart European Application No. EP 191613405.

* cited by examiner

ELECTRONIC DEVICE FOR COMPENSATING COLOR OF DISPLAY

CROSS-REFERENCE TO RELATED APPLICATION

This application is based on and claims priority under 35 U.S.C. § 119 to Korean Patent Application No. 10-2018-0026746, filed on Mar. 7, 2018, in the Korean Intellectual Property Office, the disclosure of which is incorporated by reference herein its entirety.

BACKGROUND

1. Field

The disclosure relates to a technology of compensating a color of a display.

2. Description of Related Art

Recently, an electronic device, such as a smartphone, a wearable device, which is equipped with a display or the like has been widely supplied. The electronic device may execute several functions through the display. For example, the electronic device may capture a photo or a moving picture through the display and may obtain a user input.

Displays may have mutually different characteristics due to the difference caused in the manufacturing process. For example, some displays may output reddish screens, and other displays may display greenish screens. Accordingly, displays which express mutual different colors may be provided for user, and the users may be inconvenient.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and to provide at least the advantages described below. Accordingly, an example aspect of the disclosure is to provide an electronic device to address the above mentioned problems and problems referenced in the disclosure.

In accordance with an example aspect of the disclosure, an electronic device may include a housing including a front plate and a back plate opposite the front plate, a touchscreen display exposed through a portion of the front plate and including an organic light emitting diode (OLED), a fingerprint sensor interposed between the display and the back plate overlapping the display when viewed above the front plate, and including an optical sensor configured to provide grayscale data, a processor operatively connected with the display and the fingerprint sensor, and a memory operatively connected with the processor and storing an instruction. The instruction may, when executed by the processor, control the electronic device to output a white screen on the display, to capture an image using the fingerprint sensor while outputting the white screen, to obtain grayscale data associated with the image from the fingerprint sensor, to process the grayscale data by referring to one hue value selected from hue values stored in the memory, and to compensate the display using a result obtained by processing the grayscale data.

In accordance with another example aspect of the disclosure, a method for compensating a color of a display may include outputting a white screen on the display, capturing an image using a fingerprint sensor while outputting the white screen, obtaining grayscale data associated with the image from the fingerprint sensor, processing the grayscale data by referring to one hue value selected from hue values stored in a memory, and compensating the display using a result obtained by processing the grayscale data.

In accordance with another example aspect of the disclosure, an electronic device may include a housing including a cover glass, a back cover opposite to the cover glass, and a side-surface surrounding a space between the cover glass and the back cover, a display disposed inside the housing, a fingerprint sensor interposed between the display and the back cover, and a processor electrically connected with the display and the fingerprint sensor. The processor may be configured to control the fingerprint sensor to obtain an image displayed on a region of the display corresponding to the fingerprint sensor, in response to receiving an input, and may compensate a color of a screen output through the display based on first grayscale data associated with brightness of the image.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
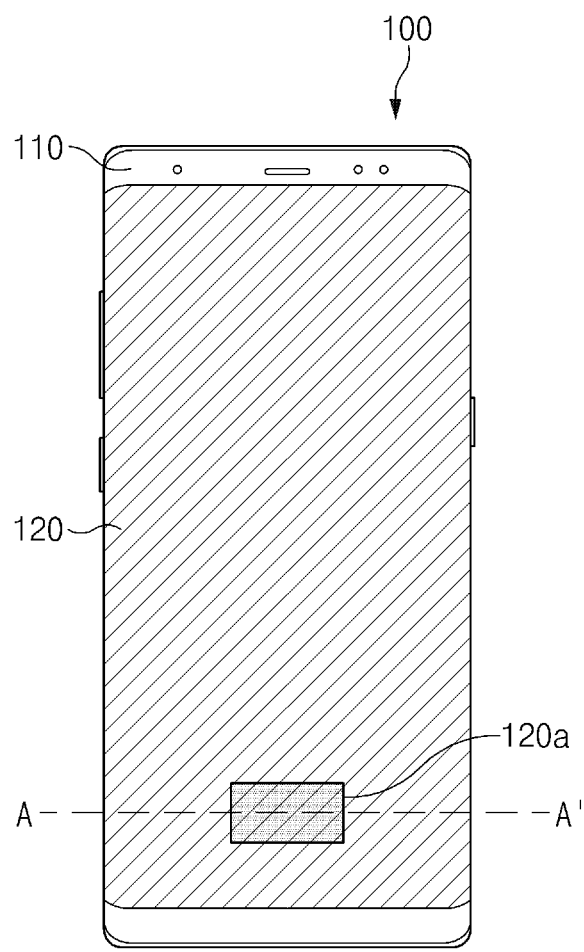
FIG. 1 is a diagram illustrating an example electronic device, according to various embodiments of the disclosure.

FIG. 1 is a diagram illustrating an example electronic device, according to various embodiments of the disclosure.

Referring to FIG. 1, an electronic device 100 may include a housing 110, a display 120, and a fingerprint sensor (not illustrated).

The housing 110 may protect various components included in the electronic device 100 from an external impact. The display 120 and the fingerprint sensor may be mounted inside the housing 110, and the housing 110 may protect the components from an external impact.

The display 120 may be disposed inside the housing 110. The display 120 may output various content (e.g., a text, an image, a video, an icon, a widget, or a symbol) and/or may obtain (e.g., receive) a touch input (including a touch, a gesture, or a hovering) from a user.

According to an embodiment of the disclosure, the electronic device 100 may obtain an image 120a output onto a partial region of the display 120. The electronic device 100 may obtain grayscale data from the image 120a and may compensate the color of the display 120, based on the obtained grayscale data. For example, when the color of the display 120 is reddish, the electronic device 100 may compensate the color of the display 120 such that the color is not reddish. In the disclosure, the grayscale data, which may refer, for example, to data associated with the brightness of the image 120a, may include multiple gray scales and/or multiple steps.

According to a comparative example, electronic devices may have various display colors due to the difference in display manufacturing processes. For example, according to the comparative example, the electronic device may have a reddish display color due to the difference in display manufacturing processes. According to various embodiments of the disclosure, the electronic device 100 may provide the display 120, which outputs a uniform color for a user by correcting or compensating for the difference.

Figure 2:
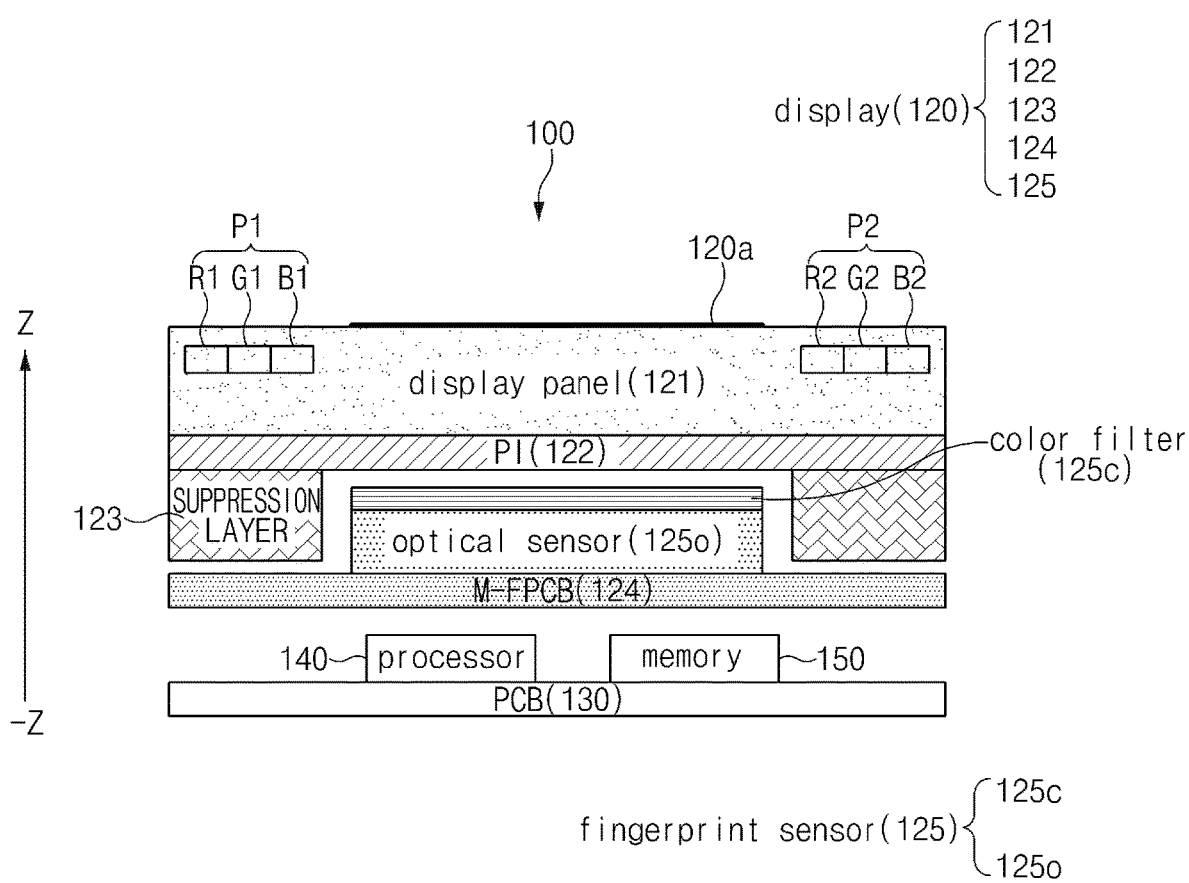
FIG. 2 is a cross-sectional view illustrating an example electronic device, according to various embodiments of the disclosure.

FIG. 2 is a cross-sectional view illustrating an example electronic device, according to various embodiments of the disclosure. FIG. 2 is a cross-sectional view taken along line A-A' of the electronic device 100 illustrated in FIG. 1.

Referring to FIG. 2, the electronic device 100 may include the display 120, a printed circuit board (PCB) 130, a processor (e.g., including processing circuitry) 140, and a memory 150.

The display 120 may include, for example, and without limitation, a display panel 121, a polyimide (PI) film 122, a suppression layer 123, a module-flexible printed circuit board (M-FPCB) 124, and a fingerprint sensor 125.

The display panel 121 may include a plurality of pixels P1 and P2 mounted thereon. The pixels P1 and P2 may include red sub-pixels R1 and R2, green sub-pixels G1 and G2, and blue sub-pixels B1 and B2. An embodiment illustrated in FIG. 2 is provided for illustrative purposes only, and it will be understood that the disclosure is not limited thereto.

The PI film 122 may be disposed in −z direction of the display panel 121. The PI film 122 may include a wiring to supply power and/or a signal to the display panel 121. According to an embodiment, the PI film 122 may include a bendable material extending from one end of the display panel 121 to the M-FPCB 124.

The suppression layer 123 may be interposed between the display panel 121 and the PCB 130. The suppression layer 123 may include copper (Cu) and/or graphite to suppress electro-magnetic interference between the display panel 121 and the PCB 130.

The M-FPCB 124 may be electrically connected with a partial region of the PI film 122. For example, the M-FPCB 124 may be electrically connected with a conductive pattern (or wiring) formed on the PI film 122. In the disclosure, the M-FPCB 124 may be referred to as a flexible printed circuit board.

The fingerprint sensor 125 may be disposed on the M-FPCB 124. The fingerprint sensor 125 may obtain fingerprint information of a user based on light emitted from the pixels P1 and P2 and reflected from the fingerprint of the user.

According to an embodiment, the fingerprint sensor 125 may include an optical sensor 125o and/or a color filter 125c. The fingerprint sensor 125 may obtain the image 120a through the optical sensor 125o and/or the color filter 125c.

The PCB 130 may be disposed inside the electronic device 100 and mount various components thereon. For example, the processor 140 and the memory 150 may be disposed on the PCB 130.

According to an embodiment, the processor 140 may include various processing circuitry and control the fingerprint sensor 125 to obtain the image 120a output to a region of the display 120 which corresponds to the fingerprint sensor 125. When the image 120a is obtained, the processor 140 may obtain various data from the image 120a. For example, when obtaining the image 120a through the optical sensor 125o, the processor 140 may obtain the grayscale data from the image 120a. According to another embodiment, when obtaining the image 120a through the color filter 125c, the processor 140 may obtain a hue value from the image 120a. In the disclosure, the hue value may, for example, represent the color of the image 120a. For example, the hue value may represent whether the image 120a is yellowish or reddish, but the disclosure is not limited thereto.

According to an embodiment, the grayscale data and the hue value may include all grayscale values of the red sub-pixel (e.g., R1), the green sub-pixel (G1), and the blue sub-pixel (e.g., B1). However, in the case of the grayscale data, all the red sub-pixel (e.g., R1), the green sub-pixel (G1), and the blue sub-pixel (e.g., B1) may have the same grayscale values. On the other hand, in the case of the hue value, the red sub-pixel (e.g., R1), the green sub-pixel (G1), and the blue sub-pixel (e.g., B1) may have different grayscale values.

The processor 140 may compensate the color of the display 120 based on the obtained data. According to an embodiment, when the grayscale data (e.g., first grayscale data) is obtained from the image 120a, the processor 140 may compare the obtained grayscale data (e.g., the first grayscale data) with grayscale data (e.g., second grayscale data) stored in the memory 150 and may identify (determine) the color (e.g., a reddish degree) of the display 120. When the color of the display 120 is different from a reference color (e.g., white) based on the identification (determination) result (e.g., when the color of the display 120 is reddish), the processor 140 may compensate the color of the display 120 to correspond to the reference color.

According to another embodiment, when a hue value (e.g., a first hue value) is obtained from the image 120a, the processor 140 may compare the obtained hue value (e.g., the first hue value) with a hue value (e.g., a second hue value) stored in the memory 150 and may identify (determine) the color (e.g., a reddish degree) of the display 120. When the color of the display 120 is different from a reference color (e.g., white) based on the identification (determination) result (e.g., when the color of the display 120 is reddish), the processor 140 may compensate the color of the display 120 to correspond to the reference color.

According to a comparative example, electronic devices may have various display colors due to the difference in display manufacturing processes. For example, according to the comparative example, the electronic device may have a reddish display color due to the difference in display manufacturing processes. However, according to various embodiments of the disclosure, the electronic device 100 may provide the display 120, which outputs a uniform color, for a user by compensating for the difference.

In the disclosure, components having the same reference numbers as those of components of the electronic device 100 illustrated in FIGS. 1 and 2 may have the same or similar description as that made with reference to FIGS. 1 and 2.

Figure 3A:
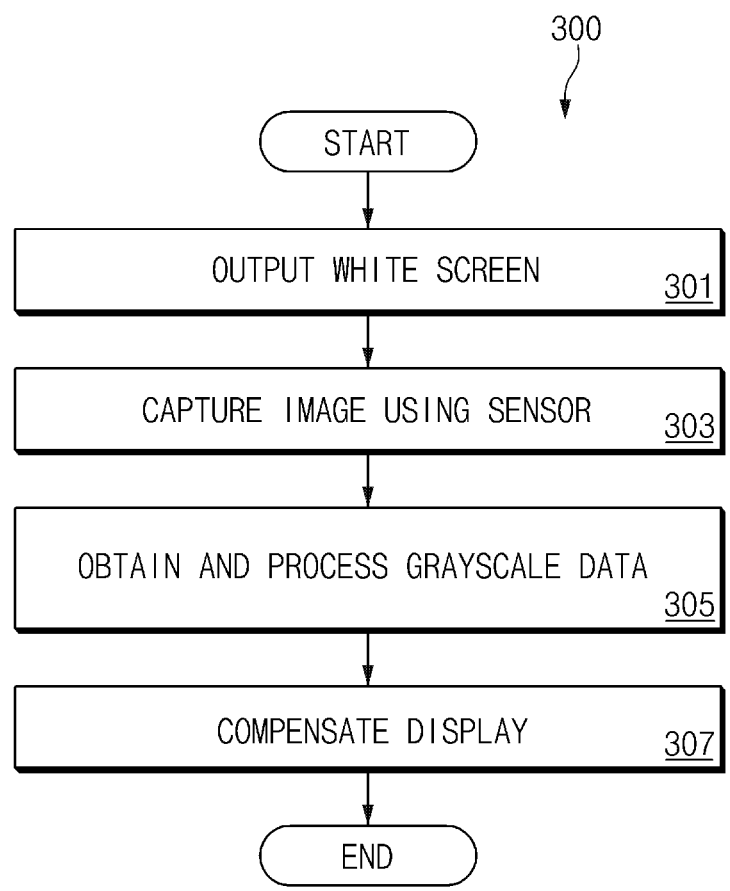
FIG. 3A is a flowchart illustrating an example operation of an electronic device, according to various embodiments of the disclosure.

FIG. 3A is a flowchart illustrating an example operation of an electronic device, according to various embodiments of the disclosure. A flowchart 300 of FIG. 3A represents a flowchart illustrating an example operation of the electronic device 100 according to an embodiment.

Referring to FIG. 3A, in operation 301, the electronic device 100 may output a white screen on the display 120. In the disclosure, the white screen may refer to a screen output through the display 120.

In operation 303, the electronic device 100 may capture the image 120a using the fingerprint sensor 125 while the display 120 outputs the white screen. For example, the electronic device 100 may capture the image 120a through the optical sensor 125o and/or may capture the image 120a through the color filter 125c.

In operation 305, the electronic device 100 may obtain grayscale data associated with the captured image 120a from the fingerprint sensor 125. In addition, the electronic device 100 may process the grayscale data by referring to any one of hue values stored in the memory 150. For example, the electronic device 100 may compare the any one hue value, which is selected, with the grayscale data.

In operation 307, the electronic device 100 may compensate the display 120 based on a result obtained by processing the grayscale data. For example, the electronic device 100 may compensate the color of the display 120 to correspond to the reference color, when the color of the display 120 is different from the reference color.

Figure 3B:
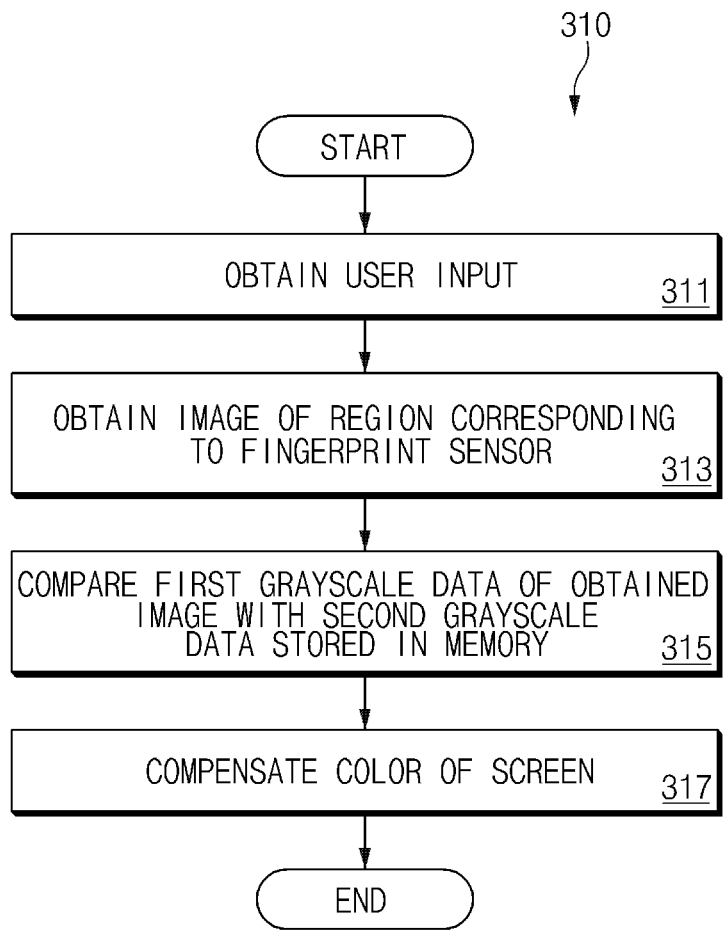
FIG. 3B is a flowchart illustrating an example operation of an electronic device, according to various embodiments of the disclosure.

FIG. 3B is a flowchart illustrating an example operation of the electronic device, according to various embodiments of the disclosure. A flowchart 310 illustrated in FIG. 3B represents a flowchart illustrating an example operation of the electronic device 100 according to another example embodiment.

Referring to FIG. 3B, in operation 311, the electronic device 100 may obtain (e.g., receive) a user input. For example, when a user executes an application for compensating the color of the display 120, the electronic device 100 may sense that the user input is obtained. According to another embodiment, when the user couples a part, which is used to compensate the color of the display 120, to the electronic device 100, the electronic device 100 may sense that the user input is obtained. The part may refer, for example, to a wired or wireless input device to compensate the color of the display 120 in the manufacturing process of the display 120.

In operation 313, the electronic device 100 may obtain an image (e.g., image 120a) of a region corresponding to the fingerprint sensor 125 disposed at the lower portion of the display 120. For example, assuming for the sake of illustration that an image of "A" is output throughout the entire region of the display 120, and an image of "B" of the image of "A" is an image of the region corresponding to the fingerprint sensor 125, the fingerprint sensor 125 may obtain (capture) the image of "B". The obtained image 120a may be transmitted from the fingerprint sensor 125 to the processor 140.

In operation 315, the electronic device 100 may obtain (or extract) grayscale data from the image (e.g., image 120a). The electronic device 100 may compare the obtained grayscale data (e.g., the first grayscale data) with grayscale data (e.g., the second grayscale data) stored in the memory 150.

Although not illustrated in FIG. 3B, the electronic device 100 may obtain (or extract) a hue value from the image (e.g., image 120a) through the color filter 125c, in addition to the grayscale data. The electronic device 100 may compare the obtained hue value with a hue value stored in the memory 150.

In operation 317, the electronic device 100 may compare the first grayscale data with the second grayscale data and may compensate the color of the display 120 based on the comparison result. For example, the electronic device 100 may compare the first grayscale data with the second grayscale data and may identify the color (the reddish degree) of the display 120. When the color of the display 120 is different from the reference data (e.g., white) (e.g., when the color of the display 120 is reddish) based on the identification result, the electronic device 100 may compensate the color of the display 120 such that the color of the display 120 corresponds to the reference color. When the color of the display 120 is substantially the same as the reference color based on the identification result, the electronic device 100 may not perform operation 317.

Although not illustrated in FIG. 3B, the electronic device 100 may compare the first hue value with the second hue value and may compensate the color of the display 120 based on the comparison result. For example, the electronic device 100 may compare the first hue value with the second hue value and may identify the color (the reddish degree) of the display 120. When the color of the display 120 is different from the reference data (e.g., when the color of the display 120 is reddish) based on the identification result, the electronic device 100 may compensate the color of the display 120 such that the color of the display 120 corresponds to the reference color. When the color of the display 120 is substantially the same as the reference color based on the identification result, the electronic device 100 may not perform operation 317.

According to an example embodiment, the electronic device 100 may store grayscale data by classifying the grayscale data into a plurality of steps, and may compensate the color of the display 120 based on each step.

TABLE 1

| Grayscale data | Compensation degree of color of display |
|---|---|
| 120 to 135 | First step |
| 136 to 150 | Second step |
| 151 to 165 | Third step |
| 166 to 180 | Fourth step |

Referring to table 1, the electronic device 100 may compensate the color of the display 120 such that the color of the display 120 corresponds to the first step, when the grayscale data obtained from the image 120a is in the range of 120 to 135. In other words, when the grayscale data obtained from the image 120a is in the range of 120 to 135, the color compensation range may be significantly wide. As the grayscale data is increased, the color compensation range may be gradually reduced because the color of the display 120 is closer to the reference color (e.g., white). For example, when the grayscale data is in the range of 166 to 180, the color compensation range may be significantly narrow.

Figure 3C:
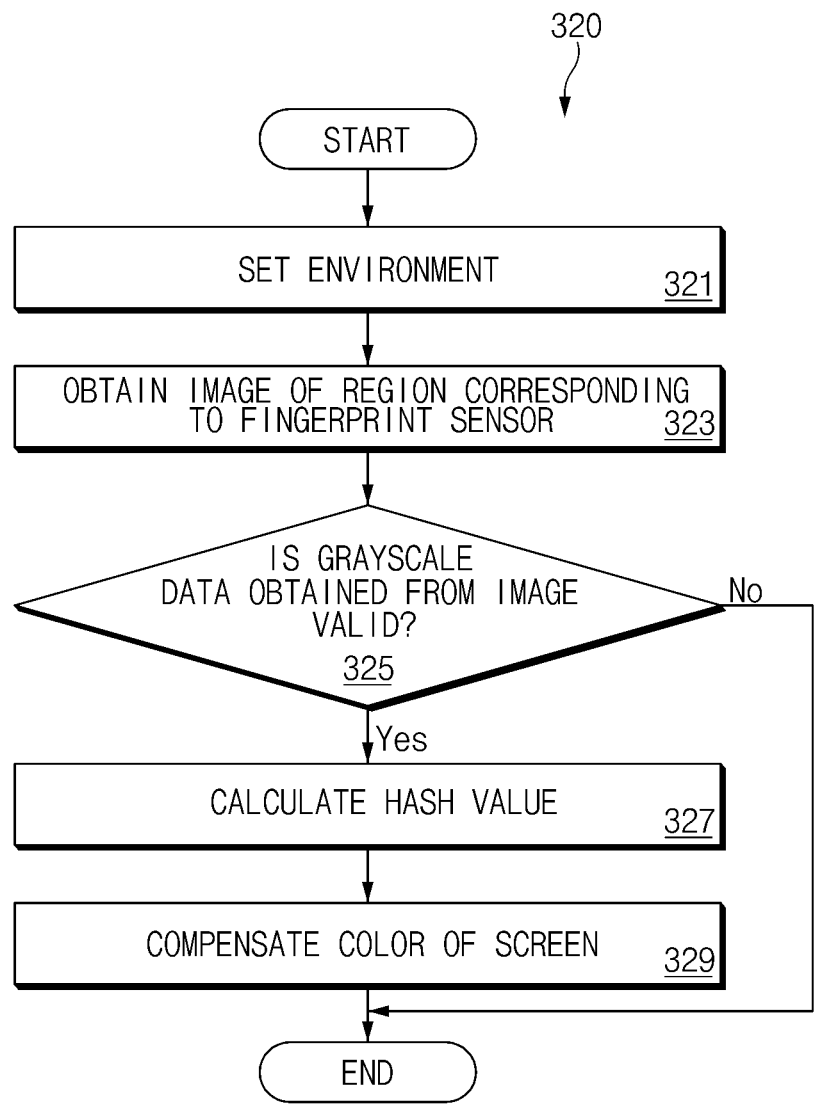
FIG. 3C is a flowchart illustrating an example operation of an electronic device, according to various embodiments of the disclosure.

FIG. 3C is a flowchart illustrating an example operation of the electronic device, according to various embodiments of the disclosure. A flowchart 320 illustrated in FIG. 3C represents a flowchart illustrating an example operation of the electronic device 100 according to another example embodiment.

Referring to FIG. 3C, in operation 321, the electronic device 100 may set the environment to compensate the color of the display 120. For example, the electronic device 100 may execute an application for compensating the color of the display 120 or may output the white screen.

In operation 323, the electronic device 100 may obtain the image (e.g., image 120a) of the region corresponding to the fingerprint sensor 125 disposed at the lower portion of the display 120. The description of operation 313 may be applied to operation 323.

In operation 325, the electronic device 100 may obtain (or extract) grayscale data from the image (e.g., image 120a). The electronic device 100 may determine whether the obtained grayscale data is valid. For example, when the grayscale data is included in a specified range, the electronic device 100 may identify that the grayscale data is valid. When the grayscale data is out of the specified range, the electronic device 100 may identify that the grayscale data is not valid.

In operation 327, the electronic device 100 may calculate a hash value corresponding to the grayscale data. The electronic device 100 may compare the calculated hash value with a hash value stored in the memory 150.

In operation 329, the electronic device 100 may compensate the color of the display 120 based on the comparison result between the calculated hash value and the hash value stored in the memory 150. For example, when the color of the display 120 is different from the reference data (e.g., when the color of the display 120 is reddish), the electronic device 100 may compensate the color of the display 120 such that the color of the display 120 corresponds to the reference color. When the color of the display 120 is substantially the same as the reference color based on the identification result, the electronic device 100 may not perform operation 329.

Figure 4:
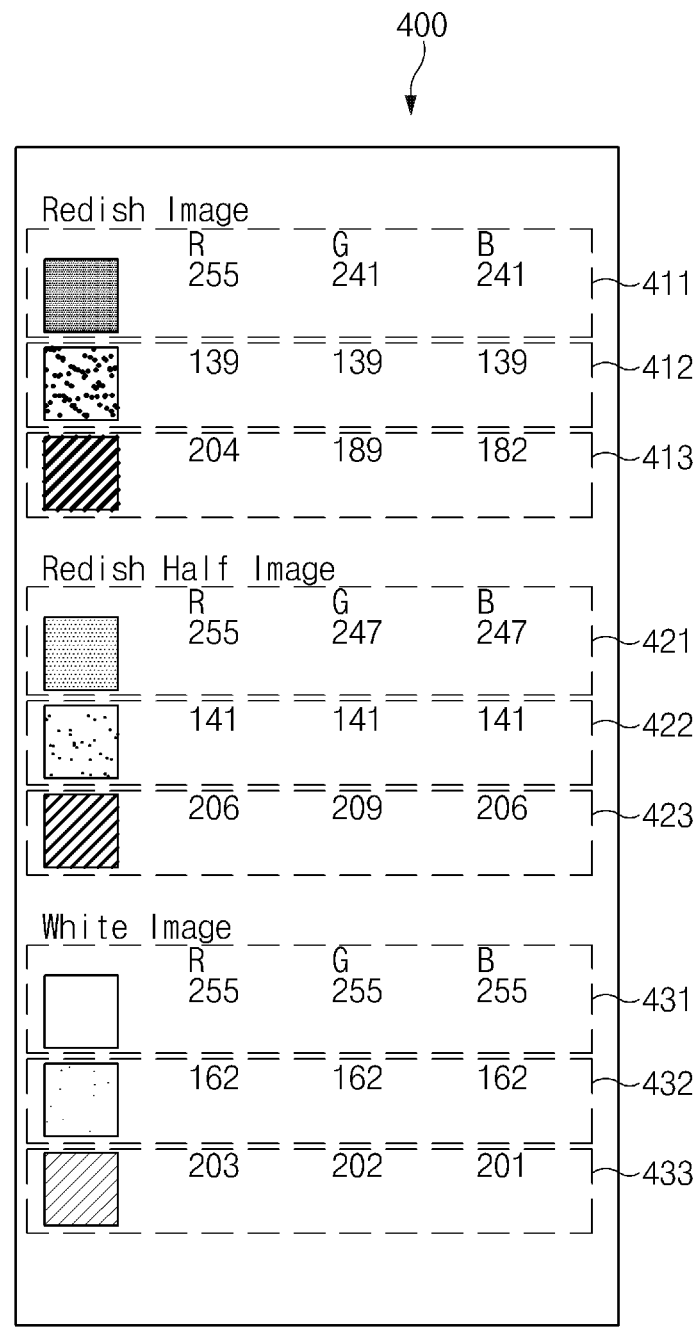
FIG. 4 is a diagram illustrating example data obtained through a fingerprint sensor, according to various embodiments of the disclosure.

FIG. 4 is a diagram illustrating example data obtained through a fingerprint sensor, according to various embodiments of the disclosure. Data 400 illustrated in FIG. 4 may refer, for example, to data used for describing various embodiments of the disclosure. For example, data 411, 412, and 413 may represent data obtained through the fingerprint sensor 125 when the color of the display 120 is significantly reddish. The data 411 may refer, for example, to a hue value of an image displayed on the display 120, the data 412 may refer, for example, to grayscale data obtained through the optical sensor 125o, and the data 413 may refer, for example, to a hue value obtained through the color filter 125c.

According to another embodiment, data 421, 422, and 423 may represent data obtained through the fingerprint sensor 125 when the color of the display 120 is more or less reddish. The data 421 may refer, for example, to a hue value of an image displayed on the display 120, the data 422 may refer, for example, to grayscale data obtained through the optical sensor 125o, and the data 423 may refer, for example, to a hue value obtained through the color filter 125c.

According to another embodiment, data 431, 432, and 433 may represent data obtained through the fingerprint sensor 125 when the color of the display 120 is white. The data 431 may refer, for example, to a hue value of an image displayed on the display 120, the data 432 may refer, for example, to grayscale data obtained through the optical sensor 125o, and the data 433 may refer, for example, to a hue value obtained through the color filter 125c.

Referring to FIG. 4, the electronic device 100 may obtain grayscale data from the image 120a, and may compare the obtained grayscale data (e.g., the first grayscale data) with grayscale data (e.g., the second grayscale data) stored in the memory 150. The electronic device 100 may identify (determine) the color of the display 120, based on the comparison result. The electronic device 100 may compensate the color of the display 120 based on the identification (determination) result.

For example, when the first grayscale data corresponds to the data 412, the electronic device 100 may identify (determine) that the color of the display 120 is significantly reddish. As the color of the display 120 is significantly reddish, the electronic device 100 may compensate the color of the display 120 such that the color of the display 120 becomes white. According to another embodiment, when the first grayscale data corresponds to the data 422, the electronic device 100 may identify (determine) that the color of the display 120 is more or less reddish. As the color of the display 120 is more or less reddish, the electronic device 100 may compensate the color of the display 120 such that the color of the display 120 becomes white. According to another embodiment, when the first grayscale data corresponds to the data 432, the electronic device 100 may identify (determine) that the color of the display 120 is white. As the color of the display 120 is white, the electronic device 100 may not compensate the color of the display 120.

According to an embodiment, the electronic device 100 may obtain a hue value from the image 120a, and may compare the obtained hue value (e.g., the first hue value) with a hue value (e.g., the second hue value) stored in the memory 150. The electronic device 100 may identify (determine) the color of the display 120, based on the comparison result. The electronic device 100 may compensate the color of the display 120 based on the identification (determination) result.

For example, when the first grayscale data corresponds to the data 413, the electronic device 100 may identify (determine) that the color of the display 120 is significantly reddish. As the color of the display 120 is significantly reddish, the electronic device 100 may compensate the color of the display 120 such that the color of the display 120 becomes white. According to another embodiment, when the first hue value corresponds to the data 423, the electronic device 100 may identify (determine) that the color of the display 120 is more or less reddish. As the color of the display 120 is more or less reddish, the electronic device 100 may compensate the color of the display 120 such that the color of the display 120 becomes white. According to another embodiment, when the first hue value corresponds to the data 433, the electronic device 100 may identify (determine) that the color of the display 120 is white. As the color of the display 120 is white, the electronic device 100 may not compensate the color of the display 120.

Figure 5:
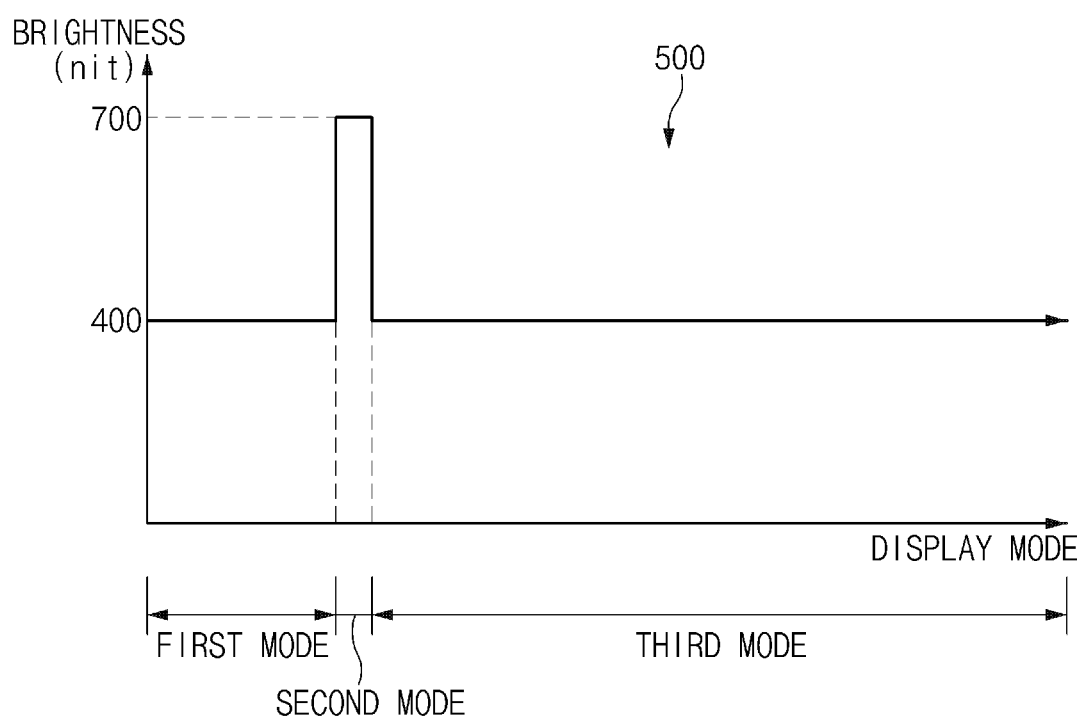
FIG. 5 is a timing diagram illustrating example operation of an electronic device, according to various embodiments of the disclosure.

FIG. 5 is a timing diagram illustrating an example operation of an electronic device, according to various embodiments of the disclosure. A timing diagram 500 illustrated in FIG. 5 is a diagram illustrating the timing used when the electronic device 100 obtains the image 120a.

Referring to FIG. 5, the electronic device 100 may change the mode of the display 120 from a first mode to a second mode when a user input is obtained (e.g., received). When the electronic device 100 enters into the second mode, the fingerprint sensor 125 may obtain the image 120a output to the region corresponding to the fingerprint sensor 125. In the disclosure, the first mode may refer, for example, to a state that the display 120 emits light having specific brightness (e.g., 400 nits). The second mode may refer, for example, to a state that the display 120 emits significantly-bright light (e.g., with the brightness of 700 nit substantially instantaneously). The first mode may be referred to as a normal mode, and the second mode may be referred to as a high brightness mode (I-IBM). According to an embodiment of the disclosure, the electronic device 100 may obtain a specific image 120a without the influence of an external illuminance by allowing the display 120 to instantaneously emit significantly-bright light. In other words, when the electronic device 100 is located outside, the external illuminance may be significantly high. The electronic device 100 may not obtain an image 120a appropriate to identifying (determining) the color of the display 120 in the state where the external illuminance is high. Accordingly, the electronic device 100 may allow the display 120 to instantaneously emit significantly-bright light before obtaining the image 120a, and may obtain a specific image 120a without the influence of the external illuminance.

According to an embodiment, the electronic device 100 may allow the entire portion of the display 120 to emit significantly-bright light or may allow a region, which corresponds to the fingerprint sensor 125, of the display 120 to emit significantly-bright light. When the electronic device 100 allows a region, which corresponds to the fingerprint sensor 125, of the display 120 to emit significantly-bright light, current consumption may be reduced.

When the image 120a is transmitted to the processor 140, the processor 140 may compare the obtained grayscale data (e.g., the first grayscale data) with grayscale data (e.g., the second grayscale data) stored in the memory 150 and may compensate the color of the display 120 based on the comparison result. For example, the electronic device 100 may compare the first grayscale data with the second grayscale data and may identify (determine) the color (the reddish degree) of the display 120. When the color of the display 120 is different from the reference data (e.g., white) (e.g., when the color of the display 120 is reddish) based on the identification (determination) result, the electronic device 100 may compensate the color of the display 120 such that the color of the display 120 corresponds to the reference color.

According to an embodiment, when the color of the display 120 is compensated, the electronic device 100 may output the compensated screen through the display 120 in a third mode.

According to an embodiment of the disclosure, an electronic device may include a housing including a front plate and a back plate opposite the front plate, a touchscreen display exposed through a portion of the front plate and including an organic light emitting diode (OLED), a fingerprint sensor interposed between the display and the back plate and overlapping the display when viewed above the front plate, and including an optical sensor configured to provide grayscale data, a processor operatively connected with the display and the fingerprint sensor, and a memory operatively connected with the processor and storing an instruction. The instruction may, when executed by the processor, control the electronic device to output a white screen on the display, to capture an image using the fingerprint sensor while outputting the white screen, to obtain grayscale data associated with the image from the fingerprint sensor, to process the grayscale data by referring to a hue value selected from hue values stored in the memory, and to compensate the display using a result obtained by processing the grayscale data.

According to an embodiment of the disclosure, the instruction may, when executed by the processor, control the electronic device to correct color balance of the display by using the result.

According to an embodiment of the disclosure, the instruction may, when executed by the processor, control the electronic device to compare the grayscale data with the hue value, and identify (determine) a color of the display based on a comparison result.

According to an embodiment of the disclosure, the instruction may, when executed by the processor, control the electronic device to compensate the color of the display such that the color of the display corresponds to a reference color based on the color of the display being different from the reference color, based on an identification (determination) result.

According to an embodiment of the disclosure, the processor may be configured to control the touchscreen display to output the white screen in response to receiving an input for compensating the display.

According to an embodiment of the disclosure, the fingerprint sensor may further include a color filter configured to capture the image. The processor may be configured to control the electronic device to obtain a first hue value from the image obtained from the color filter.

According to an embodiment of the disclosure, the memory may store a second hue value, and the processor may be configured to compare the first hue value with the second hue value, and may control the electronic device to compensate the display based on a comparison result.

According to an embodiment of the disclosure, the first hue value may correspond to a numerical value of a color represented by the image, and the second hue value may correspond to a reference value for identifying the color of the image.

According to an embodiment of the disclosure, a method for compensating a color of a display may include outputting a white screen on the display, capturing an image using a fingerprint sensor while outputting the white screen, obtaining grayscale data associated with the image from the fingerprint sensor, processing the grayscale data by referring to a hue value selected from hue values stored in a memory, and compensating the display using a result obtained by processing the grayscale data.

According to an embodiment of the disclosure, the compensating of the display using the result obtained by processing the grayscale data may include correcting color balance of the display using the result.

According to an embodiment of the disclosure, the method may further include comparing the grayscale data with the hue value, and identifying (determining) the color of the display based on a comparison result.

According to an embodiment of the disclosure, the compensating of the display using the result obtained by processing the grayscale data may include compensating the color of the display such that the color of the display corresponds to a reference color based on the color of the display being different from the reference color, based on an identification result.

According to an embodiment of the disclosure, the method may further include causing the display to output the white screen in response to receiving an input for compensating the display.

According to an embodiment of the disclosure, the method may further include obtaining a first hue value from an image obtained from a color filter.

According to an embodiment of the disclosure, the compensating of the display using the result obtained by processing the grayscale data may include comparing the first hue value with a second hue value stored in a memory, and compensating the display based on a comparison result.

According to an embodiment of the disclosure, the first hue value may correspond to a numerical value of a color represented by the image, and the second hue value may correspond to a reference value for identifying the color of the image.

According to an embodiment of the disclosure, an electronic device may include a housing including a cover glass, a back cover opposite the cover glass, and a side-surface surrounding a space between the cover glass and the back cover, a display disposed inside the housing, a fingerprint sensor interposed between the display and the back cover, and a processor electrically connected with the display and the fingerprint sensor. The processor may cause the fingerprint sensor to obtain an image displayed on a region of the display corresponding to the fingerprint sensor, in response to receiving an input, and may compensate a color of a screen output through the display based on first grayscale data associated with brightness of the image.

According to an embodiment of the disclosure, the electronic device may further include a memory to store second grayscale data. The processor may compare the first grayscale data with the second grayscale data, and compensate the color of the screen based on a comparison result.

According to an embodiment of the disclosure, the processor may compensate the color of the display such that the color of the display corresponds to a reference color based on the color of the display being different from the reference color, based on an identification result.

According to an embodiment of the disclosure, the processor may enter into a first mode that the display emits light having specific brightness level or greater, in response to receiving the input and may obtain the image displayed on the region corresponding to the fingerprint sensor in the first mode.

According to an embodiment of the disclosure, the processor may enter a second mode in which the display emits light having specific brightness when the image is obtained.

According to an embodiment of the disclosure, the processor may compensate a reddish degree of the screen based on the first grayscale data.

According to an embodiment of the disclosure, the display may include a plurality of pixels, and the processor may compensate the color of the display by adjusting the brightness of the pixels.

According to an embodiment of the disclosure, the processor may obtain the first grayscale data from the image.

According to an embodiment of the disclosure, the fingerprint sensor may include an optical sensor, and the processor may control the optical sensor to obtain an image displayed on a region of the display corresponding to the fingerprint sensor.

According to an embodiment of the disclosure, the fingerprint sensor may further include a color filter configured to obtain an image, and the processor may obtain a first hue value from the image obtained from the color filter.

According to an embodiment of the disclosure, the electronic device may further include a memory to store a second hue value, and the processor may compare the first color value and the second color value, and may identify (determine) the color of the screen based on the comparison result.

According to an embodiment of the disclosure, the processor may compensate the color of the screen such that the color of the screen corresponds to the reference color based on the color of the screen being different from the reference color, based on the identification result.

According to an embodiment of the disclosure, the processor may control the fingerprint sensor to obtain the image displayed on the region of the display corresponding to the fingerprint sensor, in response to executing an application for compensating the color of the screen.

Figure 6:
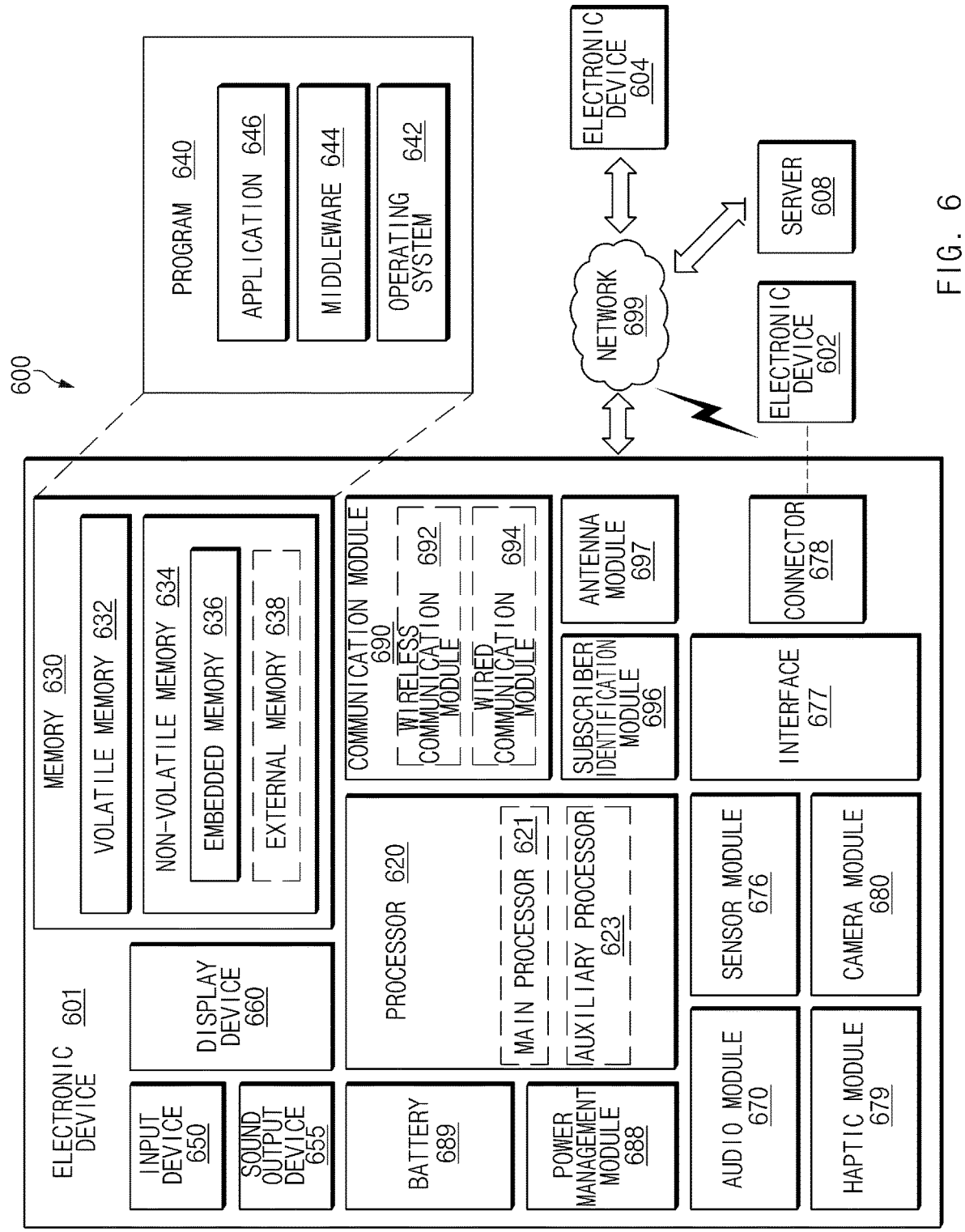
FIG. 6 is a block diagram illustrating an example electronic device in a network environment, according to various embodiments.

FIG. 6 is a block diagram illustrating an example electronic device in a network environment according to various embodiments.

Referring to FIG. 6, an electronic device 601 may communicate with an electronic device 602 through a first network 698 (e.g., a short-range wireless communication) or may communicate with an electronic device 604 or a server 608 through a second network 699 (e.g., a long-distance wireless communication) in a network environment 600. According to an embodiment, the electronic device 601 may communicate with the electronic device 604 through the server 608. According to an embodiment, the electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module 696, and an antenna module 697. According to some embodiments, at least one (e.g., the display device 660 or the camera module 680) among components of the electronic device 601 may be omitted or other components may be added to the electronic device 601. According to some embodiments, some components may be integrated and implemented as in the case of the sensor module 676 (e.g., a fingerprint sensor, an iris sensor, or an illuminance sensor) embedded in the display device 660 (e.g., a display).

The processor 620 may operate, for example, software (e.g., a program 640) to control at least one of other components (e.g., a hardware or software component) of the electronic device 601 connected to the processor 620 and may process and compute a variety of data. The processor 620 may load a command set or data, which is received from other components (e.g., the sensor module 676 or the communication module 690), into a volatile memory 632, may process the loaded command or data, and may store result data into a nonvolatile memory 634. According to an embodiment, the processor 620 may include a main processor 621 (e.g., a central processing unit or an application processor) and an auxiliary processor 623 (e.g., a graphic processing device, an image signal processor, a sensor hub processor, or a communication processor), which operates independently from the main processor 621, additionally or alternatively uses less power than the main processor 621, or is specified to a designated function. In this case, the auxiliary processor 623 may operate separately from the main processor 621 or embedded.

In this case, the auxiliary processor 623 may control, for example, at least some of functions or states associated with at least one component (e.g., the display device 660, the sensor module 676, or the communication module 690) among the components of the electronic device 601 instead of the main processor 621 while the main processor 621 is in an inactive (e.g., sleep) state or together with the main processor 621 while the main processor 621 is in an active (e.g., an application execution) state. According to an embodiment, the auxiliary processor 623 (e.g., the image signal processor or the communication processor) may be implemented as a part of another component (e.g., the camera module 680 or the communication module 690) that is functionally related to the auxiliary processor 623. The memory 630 may store a variety of data used by at least one component (e.g., the processor 620 or the sensor module 676) of the electronic device 601, for example, software (e.g., the program 640) and input data or output data with respect to commands associated with the software. The memory 630 may include the volatile memory 632 or the nonvolatile memory 634.

The program 640 may be stored in the memory 630 as software and may include, for example, an operating system 642, a middleware 644, or an application 646.

The input device 650 may be a device for receiving a command or data, which is used for a component (e.g., the processor 620) of the electronic device 601, from an outside (e.g., a user) of the electronic device 601 and may include, for example, a microphone, a mouse, or a keyboard.

The sound output device 655 may be a device for outputting a sound signal to the outside of the electronic device 601 and may include, for example, a speaker used for general purposes, such as multimedia play or recordings play, and a receiver used only for receiving calls. According to an embodiment, the receiver and the speaker may be either integrally or separately implemented.

The display device 660 may be a device for visually presenting information to the user of the electronic device 601 and may include, for example, a display, a hologram device, or a projector and a control circuit for controlling a corresponding device. According to an embodiment, the display device 660 may include a touch circuitry or a pressure sensor for measuring an intensity of pressure on the touch.

The audio module 670 may convert a sound and an electrical signal in dual directions. According to an embodiment, the audio module 670 may obtain the sound through the input device 650 or may output the sound through an external electronic device (e.g., the electronic device 602 (e.g., a speaker or a headphone)) wired or wirelessly connected to the sound output device 655 or the electronic device 601.

The sensor module 676 may generate an electrical signal or a data value corresponding to an operating state (e.g., power or temperature) inside or an environmental state outside the electronic device 601. The sensor module 676 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 677 may support a designated protocol wired or wirelessly connected to the external electronic device (e.g., the electronic device 602). According to an embodiment, the interface 677 may include, for example, an HDMI (high-definition multimedia interface), a USB (universal serial bus) interface, an SD card interface, or an audio interface.

A connecting terminal 678 may include a connector that physically connects the electronic device 601 to the external electronic device (e.g., the electronic device 602), for example, an HDMI connector, a USB connector, an SD card connector, or an audio connector (e.g., a headphone connector).

The haptic module 679 may convert an electrical signal to a mechanical stimulation (e.g., vibration or movement) or an electrical stimulation perceived by the user through tactile or kinesthetic sensations. The haptic module 679 may include, for example, a motor, a piezoelectric element, or an electric stimulator.

The camera module 680 may shoot a still image or a video image. According to an embodiment, the camera module 680 may include, for example, at least one lens, an image sensor, an image signal processor, or a flash.

The power management module 688 may be a module for managing power supplied to the electronic device 601 and may serve as at least a part of a power management integrated circuit (PMIC).

The battery 689 may be a device for supplying power to at least one component of the electronic device 601 and may include, for example, a non-rechargeable (primary) battery, a rechargeable (secondary) battery, or a fuel cell.

The communication module 690 may establish a wired or wireless communication channel between the electronic device 601 and the external electronic device (e.g., the electronic device 602, the electronic device 604, or the server 608) and support communication execution through the established communication channel. The communication module 690 may include at least one communication processor operating independently from the processor 620 (e.g., the application processor) and supporting the wired communication or the wireless communication. According to an embodiment, the communication module 690 may include a wireless communication module 692 (e.g., a cellular communication module, a short-range wireless communication module, or a GNSS (global navigation satellite system) communication module) or a wired communication module 694 (e.g., an LAN (local area network) communication module or a power line communication module) and may communicate with the external electronic device using a corresponding communication module among them through the first network 698 (e.g., the short-range communication network such as a Bluetooth, a WiFi direct, or an IrDA (infrared data association)) or the second network 699 (e.g., the long-distance wireless communication network such as a cellular network, an internet, or a computer network (e.g., LAN or WAN)). The above-mentioned various communication modules 690 may be implemented into one chip or into separate chips, respectively.

According to an embodiment, the wireless communication module 692 may identify and authenticate the electronic device 601 using user information stored in the subscriber identification module 696 in the communication network.

The antenna module 697 may include one or more antennas to transmit or receive the signal or power to or from an external source. According to an embodiment, the communication module 690 (e.g., the wireless communication module 692) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 601 and the external electronic device 604 through the server 608 connected to the second network 699. Each of the electronic devices 602 and 604 may be the same or different types as or from the electronic device 601. According to an embodiment, all or some of the operations performed by the electronic device 601 may be performed by another electronic device or a plurality of external electronic devices. When the electronic device 601 performs some functions or services automatically or by request, the electronic device 601 may request the external electronic device to perform at least some of the functions related to the functions or services, in addition to or instead of performing the functions or services by itself. The external electronic device receiving the request may carry out the requested function or the additional function and transmit the result to the electronic device 601. The electronic device 601 may provide the requested functions or services based on the received result as is or after additionally processing the received result. To this end, for example, a cloud computing, distributed computing, or client-server computing technology may be used.

Figure 7:
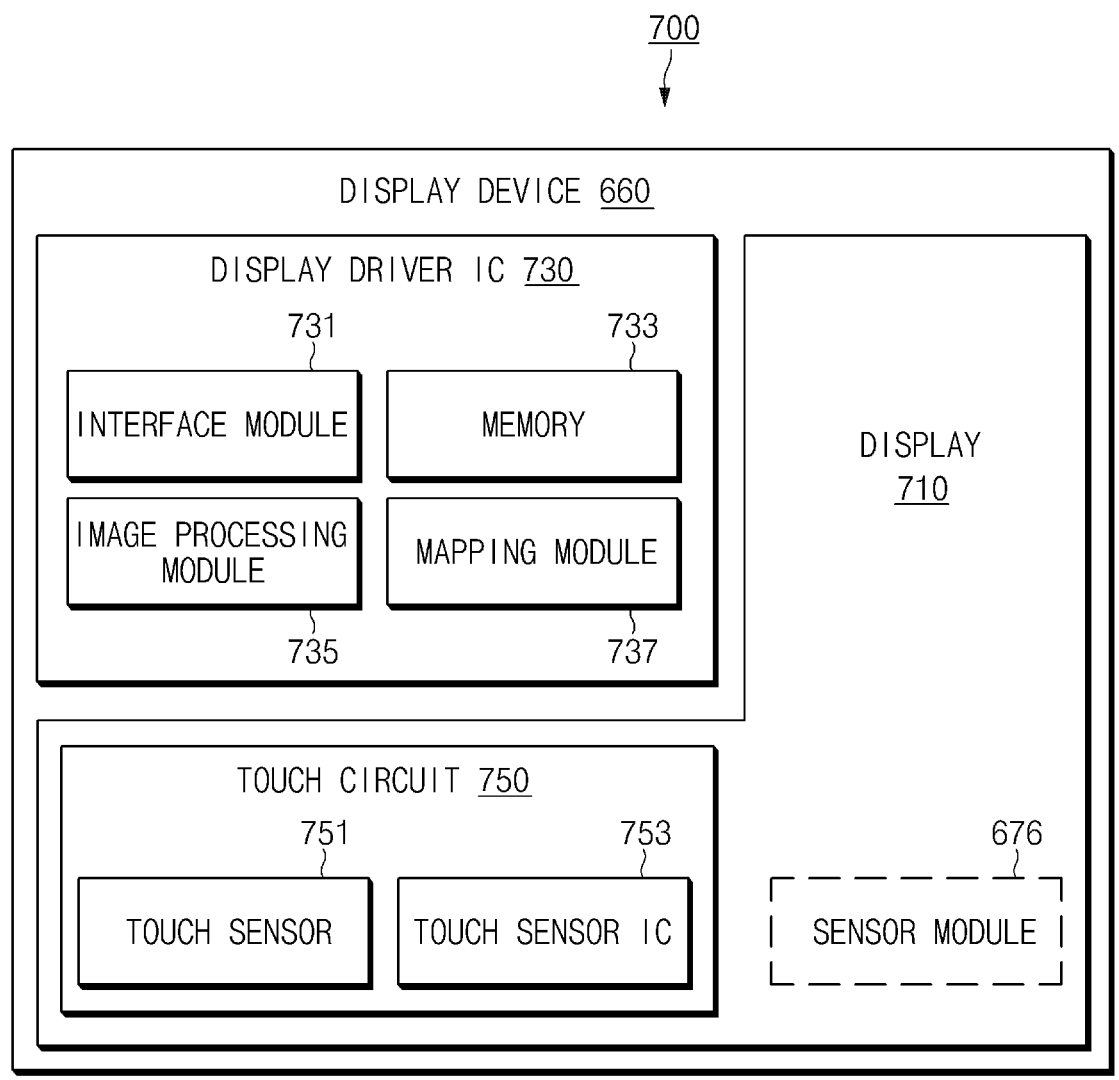
FIG. 7 is a block diagram illustrating an example display device, according to various embodiments.

FIG. 7 is a block diagram of a display device according to various embodiments.

Referring to FIG. 7, the display device 660 may include a display 710 and a display driver IC (DDI) 730 for controlling the display 710. The DDI 730 may include an interface module 731, a memory 733 (e.g., a buffer memory), an image processing module 735, or a mapping module 737. For example, the DDI 730 may receive image information including image data or an image control signal corresponding to a command for controlling the image data from a processor 620 (e.g., a main processor 621 or an application processor) or an auxiliary processor 623, which is operated independently of the main processor 621, through the interface module 731. The DDI 730 may communicate with a touch circuit 750, the sensor module 676, or the like through the interface module 731. In addition, the DDI 730 may store at least a part of the received image information in the memory 733, for example, in units of frames. For example, the image processing module 735 may perform preprocessing or post-processing (e.g., adjustment of resolution, brightness, or size) on at least a part of the image data based at least partially on characteristics of the image data or the display 710. The mapping module 737 may convert the image data preprocessed or post-processed through the image processing module 735 into a voltage value or a current value capable of driving the pixels, based at least partially on attributes of the pixels of the display 710 (e.g., an array of pixels (RGB stripe or pentile) or a size of each of subpixels). For example, at least some pixels of the display 710 may be driven based on the voltage or current value, such that visual information (e.g., a text, an image, or an icon) corresponding to the image data is displayed on the display 710.

According to an embodiment, the display device 660 may further include the touch circuit 750. The touch circuit 750 may include a touch sensor 751 and a touch sensor IC 753 for controlling the touch sensor 751. The touch sensor IC 753 may controls the touch sensor 751 to measure, for example, a change in a signal (e.g., a voltage, a light amount, a resistance, or a charge amount) at a specific position of the display 710 to sense a touch input or a hovering input, and may provide information (e.g., a location, an area, a pressure or a time) about the sensed touch input or hovering input to the processor 620. According to an embodiment, at least a part (e.g., the touch sensor IC 753) of the touch circuit 750 may be included as a part of the display driver IC 730 or the display 710, or as a part of another component (e.g., the auxiliary processor 623) arranged outside the display device 660.

According to an embodiment, the display device 660 may further include at least one sensor (e.g., a fingerprint sensor, an iris sensor, a pressure sensor or an illuminance sensor) of the sensor module 676, or a control circuitry thereof. In this case, the at least one sensor or the control circuitry thereof may be embedded in a part (e.g., the display 710 or the DDI 730) of the display device 660 or a part of the touch circuit 750. For example, when the sensor module 676 embedded in the display device 660 includes a biometric sensor (e.g., a fingerprint sensor), the biometric sensor may obtain biometric information associated with a touch input through an area of the display 710. As another example, when the sensor module 676 embedded in the display device 660 includes a pressure sensor, the pressure sensor may obtain information about a pressure corresponding to a touch input through an area or entire area of the display 710. According to an embodiment, the touch sensor 751 or the sensor module 676 may be arranged between pixels of the pixel layer of the display 710, or above or below the pixel layer.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 640) including an instruction stored in a machine-readable storage media (e.g., an internal memory 636 or an external memory 638) readable by a machine (e.g., a computer). The machine may be a device that calls the instruction from the machine-readable storage media and operates depending on the called instruction and may include the electronic device (e.g., the electronic device 601). When the instruction is executed by the processor (e.g., the processor 620), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

According to various embodiments of the disclosure, a display for outputting uniform color may be provided for the user.

Additionally, a variety of effects directly or indirectly understood through the disclosure may be provided.

While the disclosure has been illustrated and described with reference to various example embodiments thereof, it will be understood by those skilled in the art that various changes in form and details may be made therein without departing from the spirit and scope of the disclosure as defined, for example, by the appended claims and their equivalents.

What is claimed is:

1. An electronic device comprising:
   a housing including a front plate and a back plate opposite the front plate;
   a touchscreen display exposed through a portion of the front plate;
   a fingerprint sensor interposed between the touchscreen display and the back plate and overlapping the touchscreen display when viewed above the front plate, and including an optical sensor configured to provide grayscale data;
   a processor operatively connected with the touchscreen display and the fingerprint sensor; and
   a memory operatively connected with the processor and configured to store an instruction,
   wherein the instruction, when executed by the processor, controls the electronic device to:
   output a white screen on the touchscreen display via a first display setting of the touchscreen display;
   capture an image via the fingerprint sensor based on light having brightness greater than a predetermined brightness level emitted from the white screen while outputting the white screen based on the first display setting of the touchscreen display;
   obtain grayscale data associated with the image from the fingerprint sensor;
   process the grayscale data by referring to a hue value selected from hue values stored in the memory;
   adjust a display setting of the touchscreen display to a second display setting of the touchscreen display based on at least a result obtained by processing the grayscale data; and
   output another screen on the touchscreen display based on the second display setting of the touchscreen display.

2. The electronic device of claim 1, wherein adjusting the display setting includes:
   correcting color balance of the touchscreen display using the result.

3. The electronic device of claim 1, wherein the instruction, when executed by the processor, controls the electronic device to:
   compare the grayscale data with the hue value; and
   identify a color of the touchscreen display based on the comparison.

4. The electronic device of claim 3, wherein the instruction, when executed by the processor, controls the electronic device to:
   compensate the color of the touchscreen display to correspond to a reference color,
   based on the color of the touchscreen display being different from the reference color, based on an identification result.

5. The electronic device of claim 1, wherein the processor is configured to:
   control the touchscreen display to output the white screen in response to receiving an input for adjusting the display setting of the touchscreen display.

6. The electronic device of claim 1, wherein the fingerprint sensor further includes:
   a color filter configured to capture the image, and
   wherein the processor is configured to control the electronic device to:
   obtain a first hue value from the image obtained from the color filter.

7. The electronic device of claim 6, wherein the memory is configured to store a second hue value, and
   wherein the processor is configured to control the electronic device to:
   compare the first hue value with the second hue value; and
   adjust the display setting of the touchscreen display based on a result of the comparison.

8. The electronic device of claim 7, wherein the first hue value corresponds to a numerical value of a color represented by the image, and
   wherein the second hue value corresponds to a reference value for identifying the color of the image.

9. A method for compensating a display setting of a display, the method comprising:

outputting a white screen on the display using a first display setting of the display;

capturing an image using a fingerprint sensor based on at least light having brightness greater than a predetermined brightness level emitted from the white screen while outputting the white screen using the first display setting of the display;

obtaining grayscale data associated with the image from the fingerprint sensor;

processing the grayscale data by referring to a hue value selected from hue values stored in a memory;

adjusting the display setting of the display to a second display setting of the display using a result obtained by processing the grayscale data; and output another screen on the display using the second display setting of the display.

10. The method of claim 9, wherein the compensating of the display using the result obtained by processing the grayscale data includes:

correcting color balance of the display using the result.

11. The method of claim 9, further comprising:

comparing the grayscale data with the hue value; and identifying a color of the display based on a result of the comparison.

12. The method of claim 11, wherein the compensating of the display using the result obtained by processing the grayscale data includes:

compensating the color of the display to correspond to a reference color, based on the color of the display being different from the reference color, based on an identification result.

13. The method of claim 9, further comprising:

causing the display to output the white screen in response to receiving an input for adjusting the display setting of the display.

14. The method of claim 9, further comprising:

obtaining a first hue value from an image obtained from a color filter.

15. The method of claim 14, wherein the compensating of the display using the result obtained by processing the grayscale data includes:

comparing the first hue value with a second hue value stored in a memory; and adjusting the display setting of the display based on a result of the comparison.

16. The method of claim 15, wherein the first hue value corresponds to a numerical value of a color represented by the image, and wherein the second hue value corresponds to a reference value for identifying the color of the image.

17. An electronic device comprising a housing including a cover glass, a back cover opposite the cover glass, and a side-surface surrounding a space between the cover glass and the back cover;

a display disposed inside the housing;

a fingerprint sensor interposed between the display and the back cover; and a processor electrically connected with the display and the fingerprint sensor, wherein the processor is configured to control the electronic device to:

outputting a screen on the display based on at least a first color setting of the display;

cause the fingerprint sensor to obtain an image displayed on a region of the display corresponding to the fingerprint sensor based on at least light having brightness greater than a predetermined brightness level emitted from the screen, in response to receiving an input and while outputting the screen;

adjusting a color of a screen output through the display to a second color setting of the display based on first grayscale data associated with brightness of the image; and outputting another screen on the display using the second color setting of the display.

18. The electronic device of claim 17, further comprising:

a memory configured to store second grayscale data, wherein the processor is configured to control the electronic device to:

compare the first grayscale data with the second grayscale data; and adjust the color of the screen based on a result of the comparison.

19. The electronic device of claim 17, wherein the processor is configured to control the electronic device to:

enter into a first mode in which the display emits light having specific brightness or greater in response to the input; and obtain the image displayed on the region corresponding to the fingerprint sensor in the first mode.

20. The electronic device of claim 17, wherein the processor is configured to:

control the fingerprint sensor to obtain the image displayed on the region of the display corresponding to the fingerprint sensor, in response to executing an application for adjusting the color of the screen.

* * * * *